US012568567B2

(12) United States Patent
Shu

(10) Patent No.: US 12,568,567 B2
(45) Date of Patent: Mar. 3, 2026

(54) HEADLAMP

(71) Applicant: Congchao Shu, Xiangxiang (CN)

(72) Inventor: Congchao Shu, Xiangxiang (CN)

( * ) Notice: Subject to any disclaimer, the term of this patent is extended or adjusted under 35 U.S.C. 154(b) by 0 days.

(21) Appl. No.: 19/270,070

(22) Filed: Jul. 15, 2025

(65) Prior Publication Data

US 2025/0344305 A1 Nov. 6, 2025

(51) Int. Cl.

| | |
|---|---|
| ***H05B 47/17*** | (2020.01) |
| ***F21V 15/01*** | (2006.01) |
| ***F21V 21/084*** | (2006.01) |
| ***F21V 21/14*** | (2006.01) |
| ***F21V 21/30*** | (2006.01) |
| ***F21V 23/04*** | (2006.01) |
| ***F21V 23/06*** | (2006.01) |
| ***F21Y 113/10*** | (2016.01) |
| ***F21Y 115/10*** | (2016.01) |
| ***H05B 45/10*** | (2020.01) |
| ***H05B 45/20*** | (2020.01) |
| ***H05B 47/115*** | (2020.01) |

(52) U.S. Cl.

CPC ............ *H05B 47/17* (2020.01); *F21V 15/01* (2013.01); *F21V 21/084* (2013.01); *F21V 21/145* (2013.01); *F21V 21/30* (2013.01); *F21V 23/0471* (2013.01); *F21V 23/06* (2013.01); *H05B 45/10* (2020.01); *H05B 45/20* (2020.01); *H05B 47/115* (2020.01); *F21Y 2113/10* (2016.08); *F21Y 2115/10* (2016.08)

(58) Field of Classification Search

CPC ...... H05B 47/17; H05B 47/115; H05B 45/20; H05B 45/10; F21V 15/01; F21V 21/084; F21V 21/145; F21V 21/30; F21V 23/0471; F21V 23/06; F21V 2113/10; F21V 2115/10

USPC .......................................................... 362/103

See application file for complete search history.

(56) References Cited

U.S. PATENT DOCUMENTS

| | | | | |
|---|---|---|---|---|
| 9,271,343 | B2 * | 2/2016 | Mackool | H05B 47/11 |
| 11,655,969 | B2 * | 5/2023 | Gall | F21V 21/084 362/103 |
| 11,746,999 | B1 * | 9/2023 | Ernst | F21V 23/0421 362/105 |
| 2013/0265788 | A1 * | 10/2013 | O'Maley | B63B 45/04 362/477 |
| 2014/0146552 | A1 * | 5/2014 | Hui | F21V 23/0442 362/549 |
| 2017/0023189 | A1 * | 1/2017 | Keisling | H05B 47/115 |
| 2022/0201823 | A1 * | 6/2022 | Kuta | F21L 4/085 |

FOREIGN PATENT DOCUMENTS

| | | | |
|---|---|---|---|
| CN | 105042351 | A | 11/2015 |
| CN | 205938636 | U | 2/2017 |
| CN | 216715898 | U | 6/2022 |

* cited by examiner

*Primary Examiner* — Laura K Tso

(57) ABSTRACT

A headlamp includes a base, a light emitting tube, a switch button and an elastic headband. The elastic headband is connected to the base, the light emitting tube is arranged on the base, the switch button is arranged on the light emitting tube and is electrically connected with the light emitting tube, and the switch button is used for controlling the light emitting tube to switch among various lighting modes, an off mode and a long-press mode; the long-press mode is to press the switch button for a long time to make the light emitting tube directly enter the off mode from any lighting mode.

9 Claims, 7 Drawing Sheets

HEADLAMP

TECHNICAL FIELD

The present disclosure relates to the technical field of headlamps, in particular to a headlamp.

BACKGROUND

A headlamp is a lamp that is worn on a user's head and used for lighting. The headlamp does not need to be held by the user, is a lighting tool that can free two hands, and is widely used in mining operations, maintenance operations and outdoor sports, such as mine operations and outdoor orienteering. An existing lamp has multiple modes. After being opened, the modes are switched in turn until the headlamp is turned off.

For example, when a switch button is pressed, the headlamp enters a first lighting mode. In this case, the first lighting mode can meet demands of the user, so the user does not need to do additional operations, but just keep the headlamp in the first lighting mode. When the user needs to turn off the headlamp, the user needs to keep pressing the switch button of the headlamp to switch the headlamp from the first lighting mode to a second lighting mode and a third lighting mode in turn until the last mode of the headlamp is reached. Then the switch button of the headlamp is pressed again, so that the headlamp can be turned off. It can be seen that the operation of turning off the headlamp in the prior art is complicated, which greatly affects user's experience.

SUMMARY

The present disclosure provides a headlamp, which is used for solving a problem that operation of turning off a headlamp is complicated in the prior art.

The present disclosure provides a headlamp, including a base, a light emitting tube, a switch button and an elastic headband, where the elastic headband is connected to the base, the light emitting tube is arranged on the base, the switch button is arranged on the light emitting tube and is electrically connected with the light emitting tube, and the switch button is used for controlling the light emitting tube to switch among various lighting modes, an off mode and a long-press mode;

the long-press mode is to press the switch button for a long time to make the light emitting tube directly enter the off mode from any lighting mode.

The headlamp provided by the present disclosure further includes a motion mode button and a motion sensor, the motion mode button is arranged on the light emitting tube and is electrically connected with the light emitting tube, the motion mode button is used for controlling the light emitting tube to switch between a motion lighting mode and the off mode, the motion sensor is arranged on the light emitting tube and is electrically connected with the motion mode button, the motion mode button is used for controlling opening or closing of the motion sensor, and the motion sensor is used for detecting a wave signal and transmitting the wave signal to the motion mode button, so that the motion mode button controls the light emitting tube to enter the off mode.

The headlamp provided by the present disclosure further includes a motion mode indicator lamp, the motion mode indicator lamp is electrically connected with the motion mode button, and the motion mode button is used for controlling the motion mode indicator lamp to be turned on or off synchronously with the light emitting tube.

According to the headlamp provided by the present disclosure, the base includes a bottom plate, a connecting piece and a housing, the bottom plate and the housing are rotatably connected through the connecting piece, the elastic headband is connected to the bottom plate, and the light emitting tube is arranged in the housing.

According to the headlamp provided by the present disclosure, the connecting piece is a damping hinge.

According to the headlamp provided by the present disclosure, a rotation angle between the bottom plate and the housing ranges from 0 degree to 60 degrees.

According to the headlamp provided by the present disclosure, the bottom plate is provided with a clamping groove and a side notch, the clamping groove is communicated with the side notch, and the elastic headband is clamped into the clamping groove through the side notch.

According to the headlamp provided by the present disclosure, the light emitting tube includes a main light source and at least two side light sources, the main light source is arranged in a middle portion of the base, and the two side light sources are respectively arranged at two sides of the main light source.

According to the headlamp provided by the present disclosure, the side light source emits white light or red light.

The headlamp provided by the present disclosure further includes a charging port and multiple indicator lamps, the charging port is arranged on the base and is connected with the light emitting tube, and the multiple indicator lamps are sequentially arranged at one side of the base for indicating an electric quantity of the light emitting tube.

The headlamp provided by the present disclosure further includes a protective plate, the protective plate is detachably connected to the housing and arranged in front of the light emitting tube.

The headlamp provided by the present disclosure includes the base and the elastic headband, and the base is fixed at a head of the user by the elastic headband. The light emitting tube is arranged on the base, so that the light emitting tube may be fixed at the head of the user, so that the user does not need to hold the headlamp for use, and the convenience of use is improved. The switch button is arranged on the light emitting tube, and opening and closing of the light emitting tube are controlled by the switch button. In the present application, the light emitting tube includes one long-press mode, and the light emitting tube enters the long-press mode by pressing the switch button for a long time. In the long-press mode, the light emitting tube will be directly turned off. Therefore, a problem that the light emitting tube can be rotated from the first light emitting mode to the off mode only by frequently pressing the switch button is avoided, and the convenience of the headlamp is improved.

DESCRIPTION OF THE DRAWINGS

In order to illustrate the technical solutions in the embodiments of the present disclosure or in the related art more clearly, the drawings used in the description of the embodiments or the prior art will be briefly described below. Obviously, the drawings in the following description are merely some embodiments recorded in the disclosure. For those of ordinary skills in the art, other drawings may also be obtained based on these drawings without going through any creative work.

DETAILED DESCRIPTION OF PREFERRED EMBODIMENTS

In order to make the objectives, the technical solutions and the advantages of the present disclosure clearer, the technical solutions in the present disclosure will be clearly and completely described below with reference to the drawings in the present disclosure. Apparently, the described embodiments are merely certain embodiments of the present disclosure, rather than all of the embodiments. Based on the embodiments in the present disclosure, all other embodiments obtained by those of ordinary skills in the art without going through any creative work shall fall within the scope of protection of the present disclosure.

A headlamp according to the present disclosure is described with reference to FIG. 1 below, including: a base 1, a light emitting tube 2, a switch button 3 and an elastic headband 4. The elastic headband 4 is connected to the base 1, the light emitting tube 2 is arranged on the base 1, the switch button 3 is arranged on the light emitting tube 2 and is electrically connected with the light emitting tube 2, and the switch button 3 is used for controlling the light emitting tube 2 to switch among various lighting modes, an off mode and a long-press mode.

The long-press mode is to press the switch button for a long time to make the light emitting tube directly enter the off mode from any lighting mode.

Figure 1:
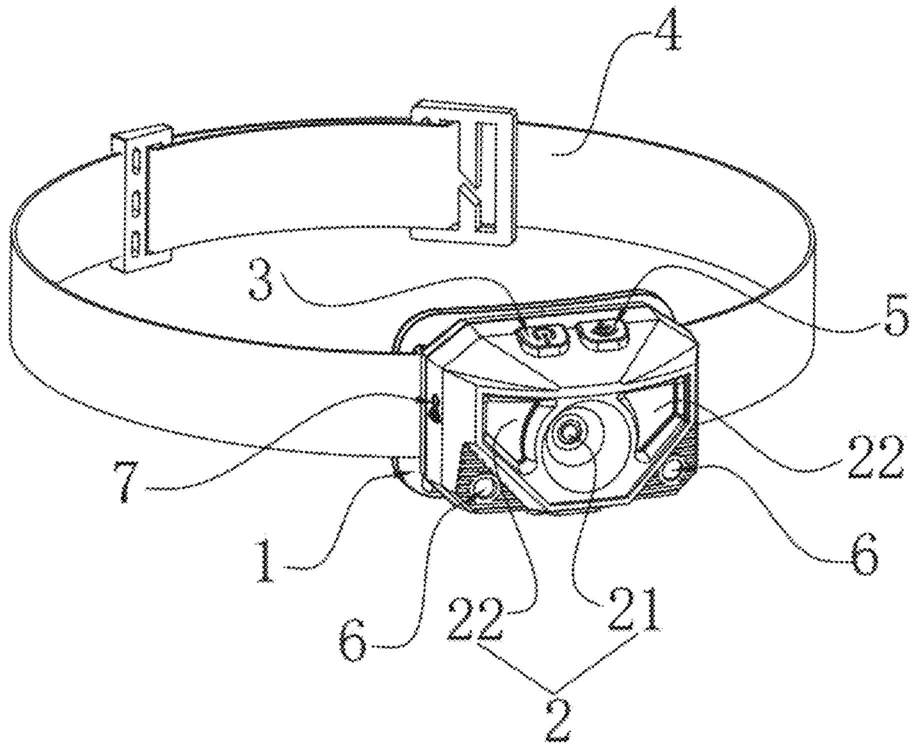
FIG. 1 is a structural schematic diagram of a headlamp provided by the present disclosure.

As shown in FIG. 1, the headlamp in the present application includes the base 1 and the elastic headband 4. The elastic headband 4 and the base 1 are connected mutually, and the base 1 is mounted through the elastic headband 4. Because the elastic headband 4 has elasticity, and the elastic headband 4 is annular in the present application, the elastic headband 4 can be contracted by an elastic force of the elastic headband 4 itself after being sleeved at the head of the user, so as to be fixed at the head of the user. The base 1 is further connected to the elastic headband 4, and then the base 1 can be fixed at the head of the user through the elastic headband 4.

Further, by installing the light emitting tube 2 on the base 1, the light emitting tube 2 may be fixed at the head of the user, so that the user does not need to hold the headlamp for use, and the convenience of the headlamp is improved. The light emitting tube 2 is provided with the switch button 3. Because the light emitting tube 2 is electrically connected with the switch button 3, the light emitting tube 2 may be controlled to be turned on or off by the switch button 3.

Generally, under normal circumstances, when the headlamp is not needed, the light emitting tube 2 is in the off state. In other words, the light emitting tube 2 does not emit light. When the headlamp is needed to be used, it is only necessary to press the switch button 3 to control the light emitting tube 2 to be turned on. After the light emitting tube 2 is turned on, lighting can be realized by the light emitted by the light emitting tube 2. With the continuous improvement of the light emitting tube 2, the existing light emitting tube 2 has a variety of lighting modes. Preferably, the light emitting tube 2 provided in the present application has six lighting modes. After the switch button 3 is pressed for the first time, the light emitting tube 2 will enter the first lighting mode from the off mode. If the first lighting mode cannot meet the demand of the user, the switch button 3 may be pressed again, so as to control the light emitting tube 2 to switch from the first lighting mode to the second lighting mode. By analogy, every time the switch button 3 is pressed, the light emitting tube 2 may be controlled to switch once. When the light emitting tube 2 is in a sixth lighting mode, the switch button 3 is pressed again. In this case, the sixth lighting mode is the last lighting mode, and there are no other lighting modes subsequently. Therefore, pressing the switch button 3 in this case will control the light emitting tube 2 to switch from the sixth lighting mode to the off mode.

Usually, the first lighting mode is the most commonly used lighting mode, which can meet most daily use requirements, so in the process of use, the light emitting tube 2 is usually directly switched to the first lighting mode for use. As can be seen from the above, in this case, it is necessary to press the switch button 3 six times to switch the light emitting tube 2 from the first lighting mode to the off mode. Therefore, such an operation mode is complicated, which greatly affects the use experience of the headlamp, and the switch button 3 needs to be pressed several times every time the headlamp is used, which will also reduce a service life of the switch button 3.

In the present application, a long-press mode is further designed for the light emitting tube 2 in addition to the six lighting modes and the off mode. A trigger condition of the long-press mode is to press the switch button 3 for a long time. Preferably, in this embodiment, a long-press time of the long-press mode is 3 seconds, that is, pressing the switch button for 3 seconds can enter the long-press mode. In different embodiments, the long-press time may be adjusted, for example, 2 seconds, 4 seconds or 5 seconds, and is not limited here. An effect of the long-press mode is that the light emitting tube 2 can directly enter the off mode from any lighting mode, thus avoiding complicated operation of pressing the switch button 3 for multiple times and improving the convenience of the headlamp.

According to the headlamp provided by the present application, the long-press mode is arranged in the light emitting tube 2, so that the convenience of the headlamp is improved, and a problem that the switch button 3 needs to be pressed frequently to switch to the off mode is solved.

In one embodiment, the headlamp further includes a motion mode button 5 and a motion sensor 6, the motion mode button 5 is arranged on the light emitting tube 2 and is electrically connected with the light emitting tube 2, the motion mode button 5 is used for controlling the light emitting tube 2 to switch between a motion lighting mode and the off mode, the motion sensor 6 is arranged on the light emitting tube 2 and is electrically connected with the motion mode button 5, the motion mode button 5 is used for controlling the motion sensor 6 to be turned on or off, and the motion sensor 6 is used for detecting a wave signal and transmitting the wave signal to the motion mode button 5, so that the motion mode button 5 controls the light emitting tube 2 to enter the off mode.

Figure 2:
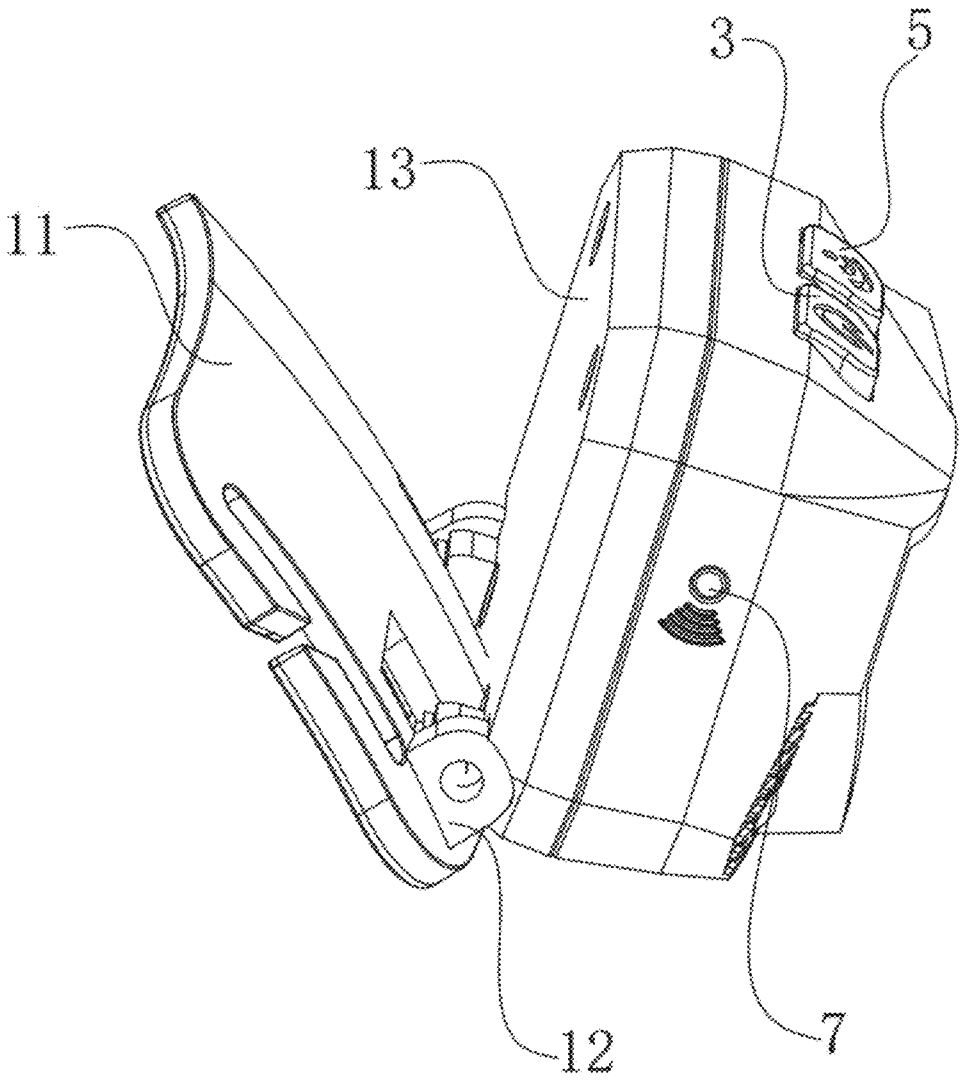
FIG. 2 is a schematic structural diagram of a bottom plate after rotating relative to a housing provided by the present disclosure.

Please refer to FIG. 1 and FIG. 2 together. One motion mode button 5 is further arranged above the light emitting tube 2, and the motion mode button 5 and the switch button 3 are arranged at an interval, so that accidental touch can be avoided when pressing, and accurate pressing of the motion mode button 5 or the switch button 3 can be ensured. Similarly, the motion mode button 5 is also electrically connected to the light emitting tube 2, so as to control the light emitting tube 2 to be turned on or off. Compared with the switch button 3 used in normal situations, the motion mode button 5 is used in motion situations. In the case of motion, the user may need hands thereof to move together, so other pollutants such as sweat stains may appear on the hands of the user. When the motion of the user is completed, the user may press the switch button 3 or the motion mode button 5 with the hand carrying pollutants to turn off the light emitting tube 2, which may cause pollution to the light emitting tube 2.

Figure 3:
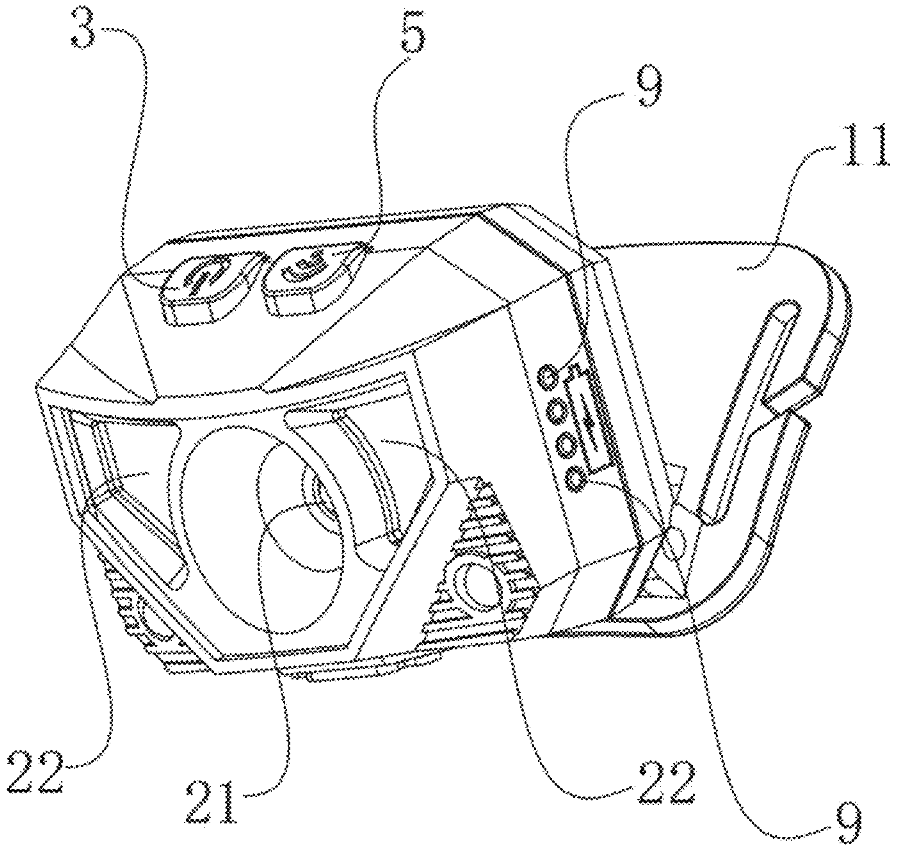
FIG. 3 is a schematic structural diagram showing a right side of the bottom board after rotating relative to the housing provided by the present disclosure.

Please refer to FIG. 1 to FIG. 3 together. The light emitting tube 2 is further provided with the motion sensor 6. In this embodiment, two motion sensors 6 are illustrated for example. The two motion sensors 6 are symmetrically arranged at both sides of the light emitting tube 2, so that signal detection can be performed more comprehensively. Moreover, the motion mode button 5 is also electrically connected to the motion sensor 6. Therefore, after the motion mode button 5 is pressed, the light emitting tube 2 and the motion sensor 6 are turned on at the same time.

When the user needs to move, the user presses the motion mode button 5 in advance to make the headlamp enter the motion mode, and then the user can start motion. In this case, the light emitting tube 2 emits light after being turned on, which plays a role of lighting. After the motion sensor 6 is turned on, the signal detection is performed. In the present application, the motion sensor 6 detects a wave signal. In front of the motion sensor 6, near a position of the motion sensor 6, the motion sensor 6 can detect the signal by waving at the motion sensor 6 without touching the motion sensor 6.

After the motion sensor 6 detects the wave signal, the motion sensor 6 transmits the detected wave signal to the motion mode button 5. When the motion mode button 5 receives the wave signal transmitted by the motion sensor 6, the motion mode button 5 will control the light emitting tube 2 to directly enter the off mode. Therefore, in the present application, the light emitting tube 2 is put into the motion mode by setting the motion mode button 5, and the wave signal is detected by the motion sensor 6, so that the user can put the light emitting tube 2 into the off mode without touching the headlamp. Because the user turns off the light emitting tube 2 at a distance, there is no need to directly contact the headlamp through the hand thereof, so the headlamp is prevented from being polluted.

In one embodiment, the headlamp further includes a motion mode indicator lamp 7, the motion mode indicator lamp is electrically connected with the motion mode button 5, and the motion mode button 5 is used for controlling the motion mode indicator lamp 7 to be turned on or off synchronously with the light emitting tube 2.

Please refer to FIG. 1 and FIG. 2 together. The motion mode indicator lamp 7 is arranged on a side surface of the light emitting tube 2, and the motion mode indicator lamp 7 is also electrically connected with the motion mode button 5. Therefore, when the motion mode button 5 is pressed, the light emitting tube 2, the motion sensor 6 and the motion mode indicator lamp 7 may be turned on synchronously. Similarly, when the motion mode button 5 receives the wave signal transmitted by the motion sensor 6, not only the light emitting tube 2, but also the motion sensor 6 and the motion mode indicator lamp 7 are turned off synchronously. The light emitting tube 2 is used to emit light for lighting, and the motion sensor 6 is used to detect the wave signal, so that the user can turn off the light emitting tube 2 at a distance, while the motion mode indicator lamp 7 is used to indicate that the motion sensor 6 has been turned on.

Further, the motion mode indicator lamp 7 is electrically connected with the motion sensor 6, and when the motion mode indicator lamp 7 detects the signal that the motion sensor 6 is turned on, the motion mode indicator lamp 7 is turned on again to indicate. If the motion sensor 6 is damaged, when the motion mode button 5 controls the motion sensor 6 to be turned on, the motion sensor 6 cannot be turned on, and the motion mode indicator lamp 7 does not detect the signal that the motion sensor 6 is turned on at this time, so the motion mode indicator lamp 7 will not light up. Therefore, it is not only possible to indicate the on or off of the motion sensor 6 through the motion mode indicator lamp 7, but also to detect whether the motion sensor 6 is damaged through the motion mode indicator lamp 7.

In one embodiment, the base 1 includes a bottom plate 11, a connecting piece 12 and a housing 13, the bottom plate 11 and the housing 13 are rotatably connected through the connecting piece 12, the elastic headband 4 is connected to the bottom plate 11, and the light emitting tube 2 is arranged in the housing 13.

Please refer to FIG. 1 to FIG. 5 together. Because the elastic headband 4 is connected to the bottom plate 11, the bottom plate 11 is fixed to the head of the user by the elastic headband 4 during wearing the headlamp. After wearing, a position of the bottom plate 11 is usually kept fixed, so that a lighting range of the light emitting tube 2 is stable. Moreover, in order to make the bottom plate 11 more stable, the bottom plate 11 is preferably an arc-shaped flat plate, so as to fit the head of the user better. Making the bottom plate 11 fit the head of the user more closely can increase a contact area, reduce a pressure intensity, and improve a stability of the bottom plate 11 while improving a comfort of the bottom plate.

The bottom plate 11 is close to the housing 13 in a state of FIG. 1. In this case, the light emitting tube 2 is placed in the housing 13, and the light emitting tube 2 is protected by the housing 13. When the bottom plate 11 is close to the housing 13, the light in the light emitting tube 2 can be emitted horizontally forward, thus lighting a large area in front. In states shown in FIG. 2 to FIG. 4, since the position of the bottom plate 11 remains fixed, the bottom plate 11 and the housing 13 are rotatably connected through the connecting piece 12. Then, after the housing 13 is rotated away from the bottom plate 11, the light emitting tube 2 can be driven to rotate together through the housing 13, so that a direction of the light emitting tube 2 can be rotated downward. After the light emitting tube 2 is rotated downward, the light emitted by the light emitting tube 2 can be rotated from flat to downward, thereby lighting a lower area of the user.

In this embodiment, the bottom plate 11 and the housing 13 are rotatably connected by the connecting piece 12, so that the light emitting tube 2 can rotate, thereby adjusting the lighting range of the light emitting tube 2 and improving an applicability.

In one embodiment, the connecting piece 12 is a damping hinge. In one embodiment, a rotation angle between the bottom plate 11 and the housing 13 ranges from 0 degree to 60 degrees.

Figure 4:
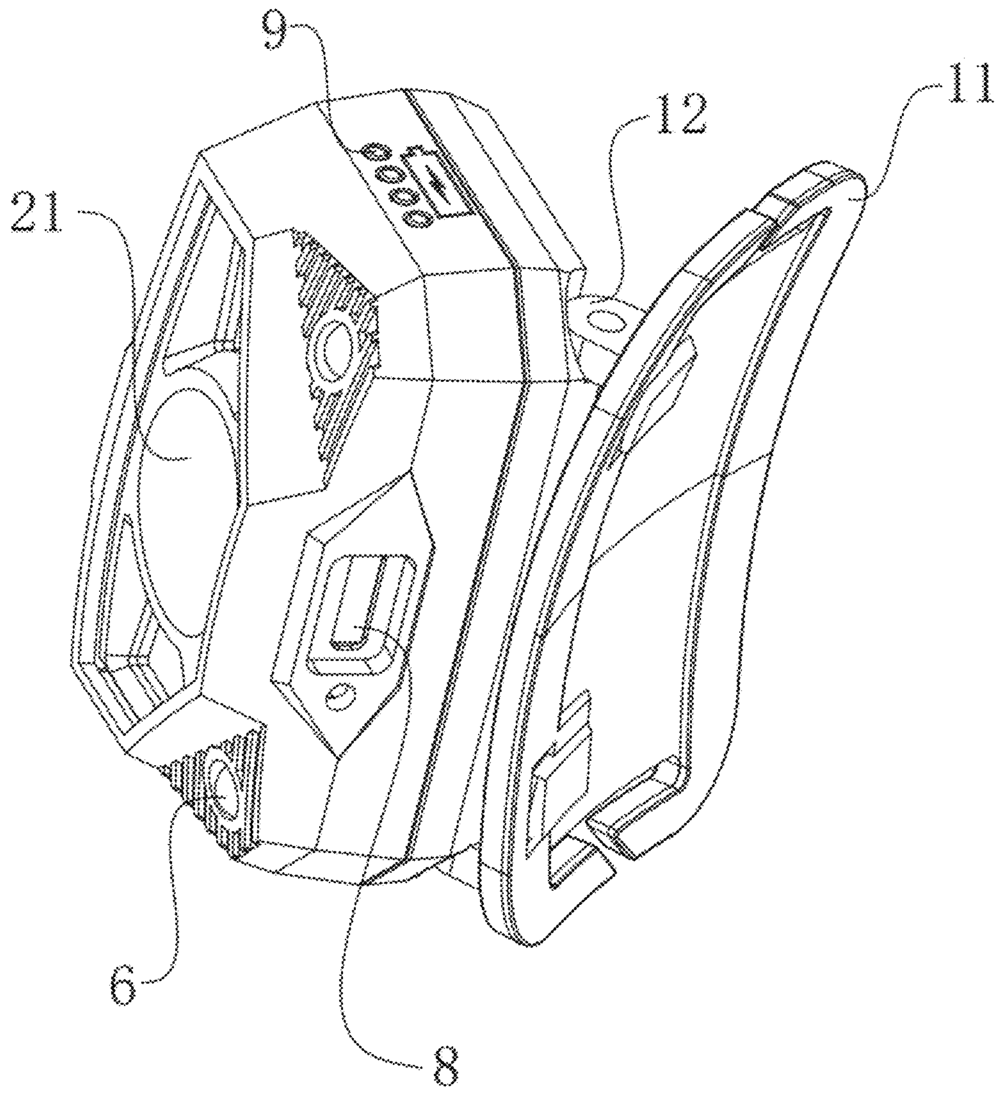
FIG. 4 is a schematic structural diagram showing a bottom portion of the bottom plate after rotating relative to the housing provided by the present disclosure.

Please refer to FIG. 2 to FIG. 4 together. In this embodiment, a maximum included angle between the bottom plate 11 and the housing 13 is set as 60 degrees. Because the light emitted by the light emitting tube 2 also has a certain angle range, when the included angle between the bottom plate 11 and the housing 13 is 60 degrees, a whole lower part of the user can be well lighted, which can meet the demand of the user. As the lighting range of the light emitting tube 2 needs to be kept stable without shaking when lighting, after the connecting piece 12 is set as a damping hinge, there is enough resistance between the housing 13 and the bottom plate 11 after the housing 13 rotates relative to the bottom plate 11, so that the housing 13 remains fixed at an angle after rotation, and a stability of the light emitting tube 2 in the housing 13 is further ensured.

In one embodiment, the bottom plate 11 is provided with a clamping groove 111 and a side notch 112, the clamping groove 111 is communicated with the side notch 112, and the elastic headband 4 is clamped into the clamping groove 111 through the side notch 112.

Figure 5:
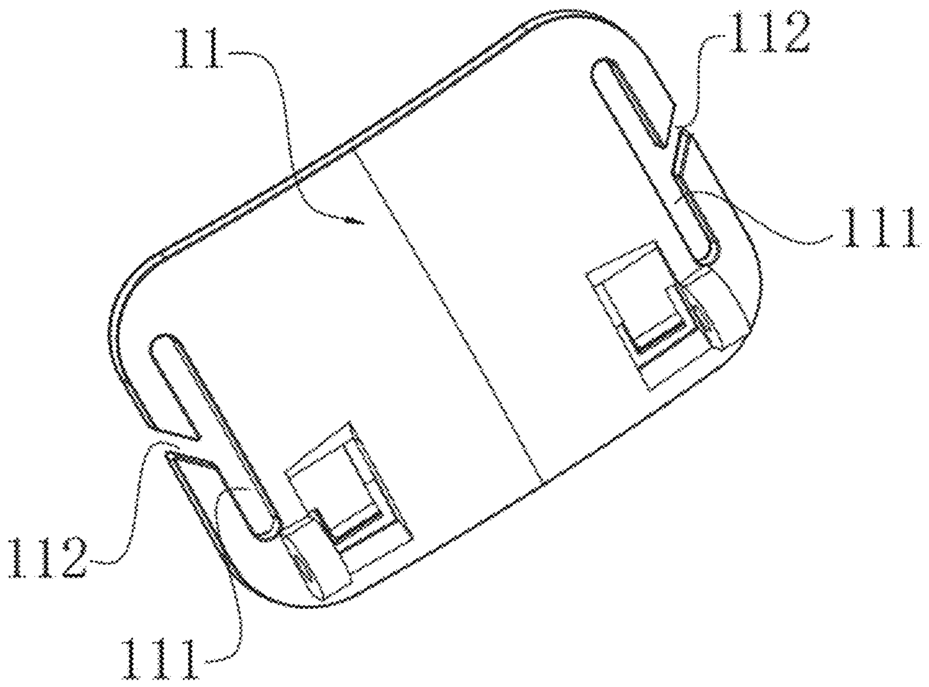
FIG. 5 is a schematic structural diagram of the bottom board provided by the present disclosure.

As shown in FIG. 5, the bottom plate 11 is a flat-plate shape, and one side of the bottom plate 11 is provided with the clamping groove 111. When the elastic headband 4 penetrates through the clamping groove 111, the elastic headband 4 and the bottom plate 11 can be connected with each other, thereby driving the bottom plate 11 to be fixed. One clamping groove 111 is also formed at an opposite side of the bottom plate 11, and the two clamping grooves 111 are symmetrically arranged, so that the elastic headband 4 penetrates through the two clamping grooves 111 in turn. When the elastic headband 4 drives the bottom plate 11 to be fixed, a stress on the bottom plate 11 can be more uniform and the bottom plate 11 can be more stable.

The clamping groove 111 is also provided with one side notch 112 communicated with the clamping groove 111. Therefore, when the elastic headband 4 penetrates through the clamping groove 111, the elastic headband 4 can be directly clamped into the clamping groove 111 along the side notch 112, so that the elastic headband 4 can be inserted more conveniently and quickly. Meanwhile, the side notch 112 is obliquely arranged toward the clamping groove 111, so after the elastic headband 4 is clamped into the clamping groove 111, the elastic headband 4 is not aligned with the side notch 112, so that the elastic headband 4 can be prevented from slipping out of the side notch 112.

In this embodiment, through the matching design of the clamping groove 111 and the side notch 112, a clamping mode of the elastic headband 4 becomes convenient and fast, and at the same time, a stability of the elastic headband 4 after clamping is ensured.

In one embodiment, the light emitting tube 2 includes a main light source 21 and at least two side light sources 22, the main light source 21 is arranged in a middle portion of the base 1, and the two side light sources 22 are respectively arranged at two sides of the main light source 21. In one embodiment, the side light source 22 emits white light or red light.

Please refer to FIG. 1 and FIG. 3 together. One main light source 21 with a larger volume is arranged in a middle portion of the light emitting tube 2. The main light source 21 can emit stronger light, thus increasing the lighting range. In this embodiment, two side light sources 22 are taken as examples. The two side light sources 22 are respectively arranged on both sides of the main light source 21, and a volume of each side light source 22 is smaller than that of the main light source 21. A light intensity of the side light source 22 is smaller than that of the main light source 21, so a lighting range of the side light source 22 is also smaller than that of the main light source 21, and energy consumption of the side light source 22 is also smaller than that of the main light source 21. Therefore, the user can adjust the light emitted by the light emitting tube 2 according to self needs.

Further, the side light source 22 has a different lighting range from that of the main light source 21, and can additionally emit red light compared with the main light source 21. Because the red light has a long wavelength and strong penetrating power, the red light emitted by the side light source 22 can still be clearly seen in bad weather such as fog, rainstorm or long distance, thus ensuring a safety warning effect. Meanwhile, the red light LED has high luminous efficiency and relatively low power consumption, which is suitable for the side light source 22 to emit.

Since the light emitting tube 2 is electrically connected to the switch button 3, the main light source 21 or the side light source 22 can be controlled by the switch button 3. Under the control of the switch button 3, the light emitting tube 2 is provided with six lighting modes, which are respectively as follows:

- in a first lighting mode, the main light source 21 emits a strong light beam;
- in a second lighting mode, the main light source 21 emits a weak light beam;
- in a third lighting mode, the side light source 22 emits a strong light beam;
- in a fourth lighting mode, the side light source 22 emits a weak light beam;
- in a fifth lighting mode, the side light source 22 emits a red light beam; and
- in a sixth lighting mode, the side light source 22 emits a twinkling red light beam.

The above are the six lighting modes controlled by the switch button 3, in addition, there are two lighting modes controlled by the motion mode button 5, which are respectively as follows:

- in a seventh lighting mode, the main light source 21 emits a strong light beam; and
- in an eighth lighting mode, the side light source 22 emits a strong light beam.

So far, the headlamp provided by the present application has a total of eight lighting modes, which can meet most needs of daily use.

In one embodiment, the headlamp further includes a charging port 8 and multiple indicator lamps 9, the charging port 8 is arranged on the base 1 and is connected with the light emitting tube 2, and the multiple indicator lamps 9 are sequentially arranged at one side of the base 1 for indicating an electric quantity of the light emitting tube 2.

Please refer to FIG. 3 and FIG. 4 together. In this embodiment, the charging port 8 is arranged below the light emitting tube 2 for charging the light emitting tube 2. On the side surface of the light emitting tube 2, there are also four indicator lamps 9. When the light emitting tube 2 is charged to 100%, each indicator lamp 9 represents 25%. In the process of charging, each indicator lamp 9 indicates that the light emitting tube 2 has been charged with 25% electricity. By analogy, 25% electricity is charged when one indicator lamp 9 is lightened, 50% electricity is charged when two indicator lamps 9 are lightened, while 75% electricity is charged when three indicator lamps 9 are lightened. When the four indicator lamps 9 are all lightened, it means that the light emitting tube 2 is charged with 100% electricity, and the charging is completed.

In one embodiment, the headlamp further includes a protective plate 14, the protective plate 14 is detachably connected to the housing 13 and arranged in front of the light emitting tube 2.

Figure 6:
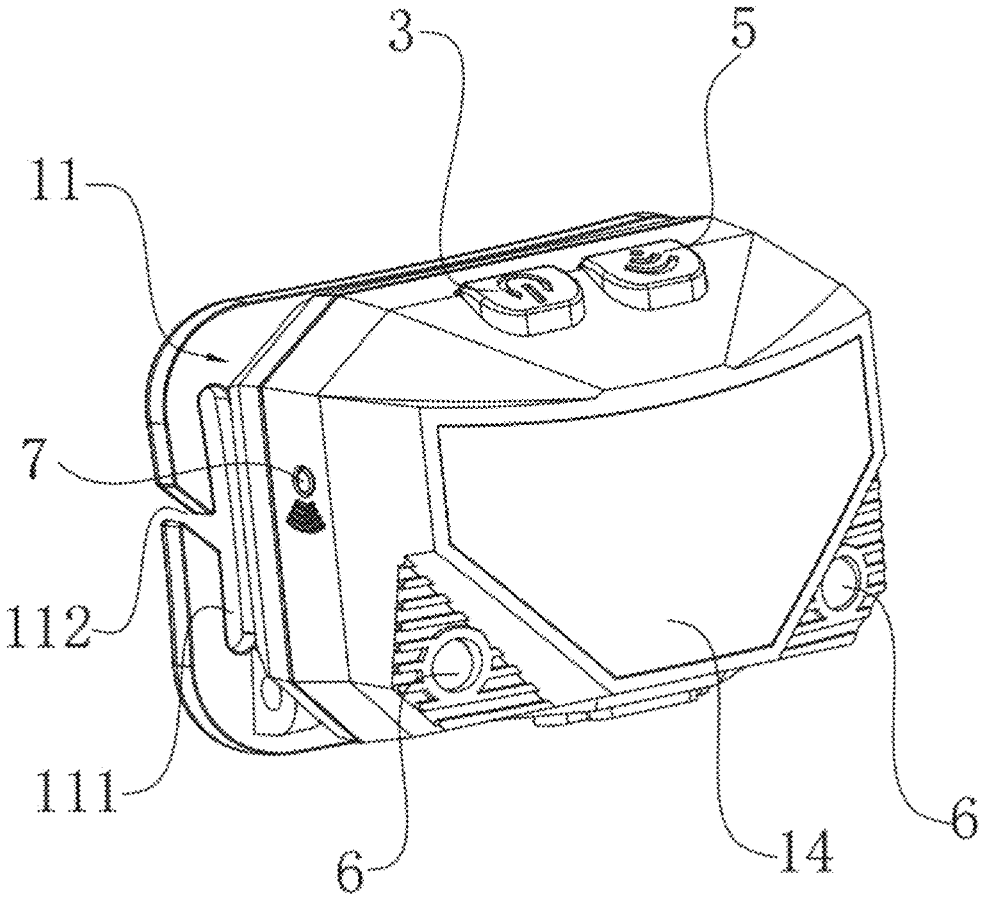
FIG. 6 is a schematic structural diagram of a protective plate after being covered with a light emitting tube provided by the present disclosure.
Figure 7:
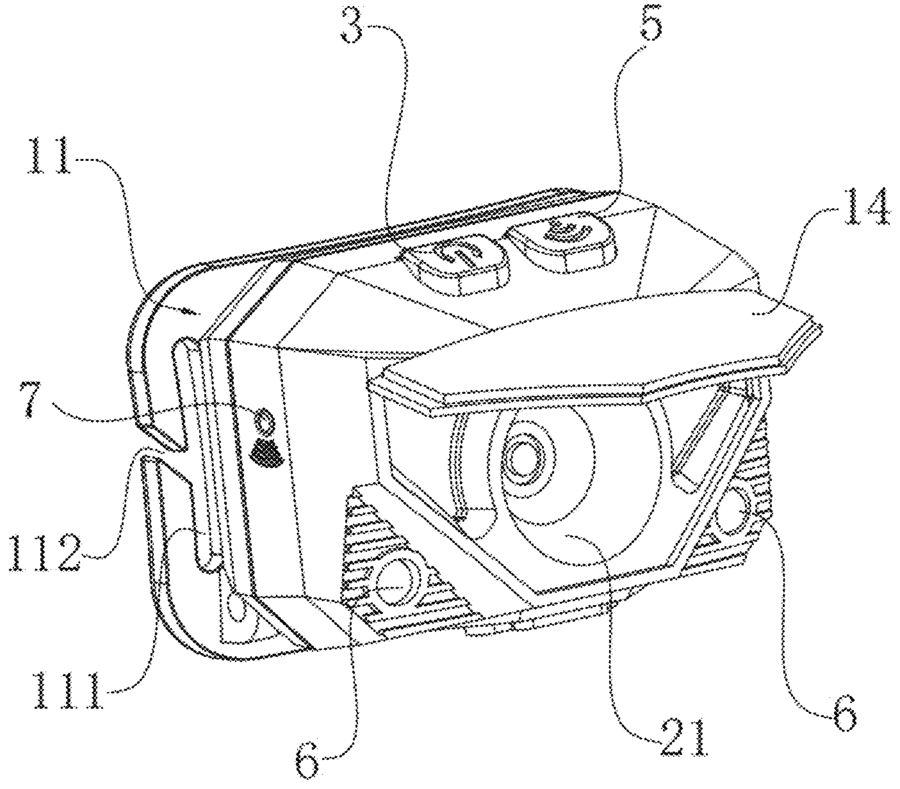
FIG. 7 is a schematic structural diagram of the protective plate after being opened provided by the present disclosure.

Please refer to FIG. 6 and FIG. 7 together. After the light emitting tube 2 is arranged in the housing 13, a periphery of the light emitting tube 2 can be protected by the housing 13. However, the light emitting tube 2 needs to emit light forward, so the housing 13 wraps a rest portion of the light emitting tube 2, and enough space is reserved in front of the light emitting tube 2, so that the light emitting tube 2 can normally emit light for lighting. Usually, the front of the light emitting tube 2 is made of transparent glass. When lighting is not needed, the light emitting tube 2 is in a closed state, so it is necessary to protect the light emitting tube 2. Therefore, one protective plate 14 is further provided in this embodiment. When lighting is not needed, the protective plate 14 is covered in front of the light emitting tube 2. In this case, the protective plate 14 and the housing 13 are combined to form a tight closed space to fully protect the light emitting tube 2. When it is necessary to use the light emitting tube 2 for lighting, the protective plate 14 can be detached from the housing 13.

Finally, it should be explained that the above embodiments are only used to illustrate the technical solution of the present disclosure, rather than limiting the present disclosure; although the present disclosure has been described in detail with reference to the foregoing embodiments, those with ordinary skills in the art should understand that: the technical solutions described in the foregoing embodiments can be still modified, or some or all of the technical features can be equivalently replaced. However, these modifications or substitutions shall not depart from the spirit and scope of the technical solutions of the embodiments of the present disclosure.

I claim:

1. A headlamp, comprising: a base, a light emitting tube, a switch button and an elastic headband, wherein the elastic headband is connected to the base, the light emitting tube is arranged on the base, the switch button is arranged on the light emitting tube and is electrically connected with the light emitting tube, and the switch button is used for controlling the light emitting tube to switch among various lighting modes, an off mode, and a long-press mode;

wherein, the long-press mode is to press the switch button for a long time to make the light emitting tube directly enter the off mode from any lighting mode;

wherein the headlamp further comprises a motion mode button, a motion sensor, and a motion mode indicator lamp, the motion mode button is arranged on the light emitting tube and is electrically connected with the light emitting tube, the motion mode button is configured for controlling the light emitting tube to switch between a motion lighting mode and the off mode, the motion sensor is arranged on the light emitting tube and is electrically connected with the motion mode button, the motion mode button is configured for controlling the motion sensor to be turned on or off, and the motion sensor is configured for detecting a wave signal and transmitting the wave signal to the motion mode button, so that the motion mode button controls the light emitting tube to enter the off mode; and the motion mode indicator lamp is electrically connected with the motion mode button, and the motion mode button is configured for controlling the motion mode indicator lamp to be turned on or off synchronously with the light emitting tube.

2. The headlamp according to claim 1, wherein the base comprises a bottom plate, a connecting piece and a housing, the bottom plate and the housing are rotatably connected through the connecting piece, the elastic headband is connected to the bottom plate, and the light emitting tube is arranged in the housing.

3. The headlamp according to claim 2, wherein the connecting piece is a damping hinge.

4. The headlamp according to claim 2, wherein a rotation angle between the bottom plate and the housing ranges from 0 degree to 60 degrees.

5. The headlamp according to claim 4, wherein the bottom plate is provided with a clamping groove and a side notch, the clamping groove is communicated with the side notch, and the elastic headband is clamped into the clamping groove through the side notch.

6. The headlamp according to claim 1, wherein the light emitting tube comprises a main light source and at least two side light sources, the main light source is arranged in a middle portion of the base, and the two side light sources are respectively arranged at two sides of the main light source.

7. The headlamp according to claim 6, wherein the two side light sources emit white light or red light.

8. The headlamp according to claim 1, further comprising a charging port and a plurality of indicator lamps, wherein the charging port is arranged on the base and is connected with the light emitting tube, and the plurality of indicator lamps are sequentially arranged at one side of the base for indicating an electric quantity of the light emitting tube.

9. The headlamp according to claim 2, further comprising a protective plate, wherein the protective plate is detachably connected to the housing and arranged in front of the light emitting tube.

* * * * *